Oct. 20, 1964    T. LAUFER ETAL    3,153,521
FOLDABLE LIGHT HELICOPTER
Filed Oct. 7, 1963      4 Sheets-Sheet 1

INVENTORS
THEODOR LAUFER
ANTON RATH
BY
ATTORNEY

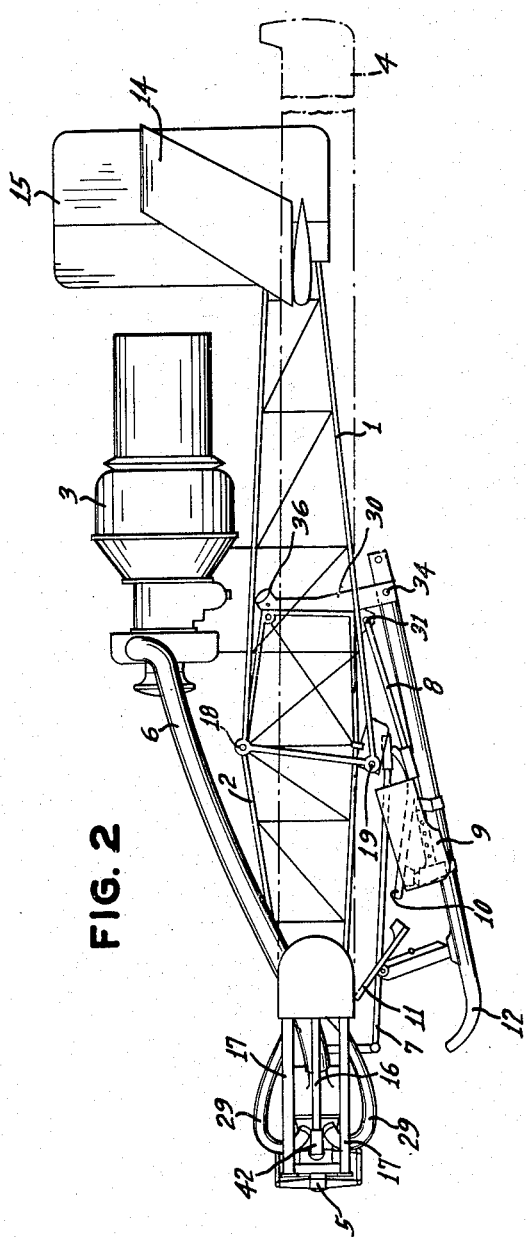
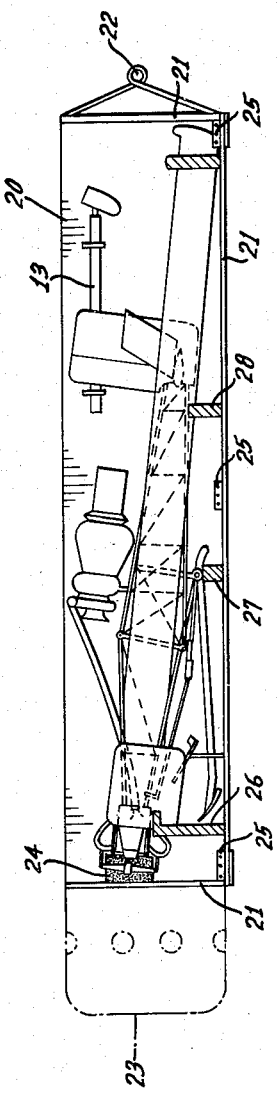
FIG. 2
FIG. 3
INVENTORS
THEODOR LAUFER
ANTON RATH

*INVENTORS*
THEODOR LAUFER
ANTON RATH
BY James E. Bryan
ATTORNEY

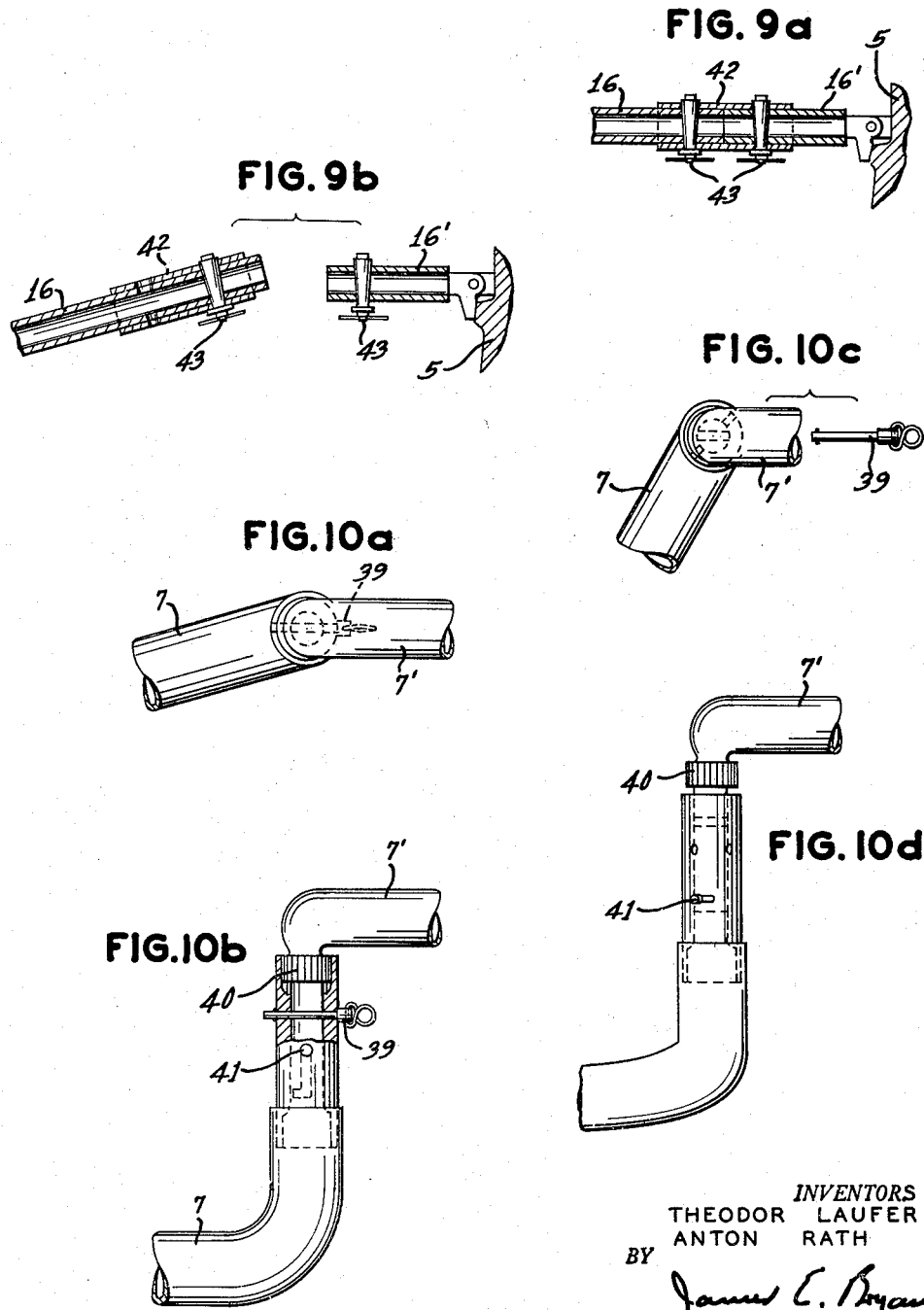

United States Patent Office 3,153,521
Patented Oct. 20, 1964

3,153,521
FOLDABLE LIGHT HELICOPTER
Theodor Laufer and Anton Rath, Friedrichshafen, Germany, assignors to Dornier-Werke, G.m.b.H., Friedrichshafen (Bodensee), Germany, a corporation of Germany
Filed Oct. 7, 1963, Ser. No. 314,427
Claims priority, application Germany, Oct. 9, 1962,
D 40,011
6 Claims. (Cl. 244—17.11)

Heliports are generally located at a point distant from the area where a helicopter is to be used and, therefore, it is oftentimes useful to be able to transport a helicopter, from its base to the area where it is to be used, in another vehicle and prepare it for use at the place to which it is transported. For example, in areas separated by mountain ranges, it may be too dangerous to fly the helicopter over the mountains when unfavorable weather conditions, such as fog, clouds, or storms and the like, are in the area. In such cases, the alternative is to transport the helicopter through a pass in the mountians or through a railroad or highway tunnel which overcomes the disadvantages of adverse weather conditions. If long distances are involved, it may also be adavntageous, especially in the case of small helicopters, to carry them to the area where they are to be used by other transportation means. Accordingly, there are many possible uses for a small helicopter, the bulky parts of which may be easily removed or modified so that the overall dimensions thereof will be greatly reduced and permit the helicopter to be packed and transported without difficulty. Also, unpacking and reassembly of the helicopter and readying it for flight are operations which must be easily and quickly performed. Such a helicopter packed in a box may be transported by truck, railway, ship, or aircraft.

Helicopters are already known in which the overall dimensions are reduced by partially dismantling them so that they can be carried on other vehicles. Loading of such partially dismantled helicopters, however, is very difficult because, among other reasons, of the relatively great risk of damage during the loading operation. For this reason, the utmost care must be observed in the placement and securing of the helicopters in compartments in which they are to be transported and special equipment is very often required for this operation. For example, in the case of one helicopter heretofore known, a hoist and a platform are necessary for partially dismantling the helicopter for transportation. This equipment must be permanently carried on board the helicopter since it is required not only for the dismantling but for the reassembly of the aircraft as well. This, however, is a great handicap since it results in a reduction of the useful load. Further, when the helicopter is partially dismantled, the rotor blades and the entire rotor head must be removed and separately packed. This dismantling and reassembly of the helicopter requires the coordinated work of highly skilled mechanics. Further, even a partial dismantling presents difficulties in that the various parts must be assembled in the proper sequence, which entails undersirable loss of time, and the necessity of readjustment of the various parts after reassembly thereof. Also, the parts must be packed very carefully and reassembled very cautiously so that all of the various elements, such as bolts and screws, are properly positioned and locked. This requirement considerably increases the time necessary for dismantling and even more so for the reassembly.

The present invention eliminates the aforementioned disadvantages and provides a helicopter of small size which is capable of being reduced to a small volume within a very short time. The helicopter is easy to pack and transport as well as unpack and make ready for flight.

The helicopter of the present invention is of an especially simple construction and is divided into two primary components, i.e., the tail boom and the rotor boom, these two elements being pivotable about a connecting joint. In the folded condition, these two components will form an essentially elongated unit adjacent to which the other projecting parts which are fixed or linked to the tail boom or rotor boom can be folded lengthwise after unlocking suitable locking devices.

The folding of the various elements is achieved by simple mechanical means. All the collapsible or foldable parts remain connected to the aircraft and are tiltable or rotatable about fixed pivots following the unlocking of simple locking devices. The folding occurs in a manner such that the parts to be folded assume a position which is primarily in the direction of the longitudinal axis of the helicopter. As a result of this extremely simple mechanical solution of the folding problem, a similarly easy reassembly of the helicopter is facilitated. Confusion of the various parts or elements of the helicopter is eliminated and reassembly thereof is possible even in the dark since all parts are always located where their function requires them to be so that they must not be separately brought to the assembly point. Further, the locking devices provide means whereby the reassembly is infallible.

The invention will be further illustrated by reference to the accompanying drawings in wihch one embodiment of a light helicopter according to the invention is shown having a tripod landing gear and rotor blades driven by jet reaction.

FIGURE 2 is a view of the helicopter in folded condition,

FIGURE 3 is a view in elevation of the helicopter packed in a box for transport, and FIGURES 4 through 10 show various details of the attachments of the various elements to be folded adjacent the tail boom and the rotor boom.

Figure 1:
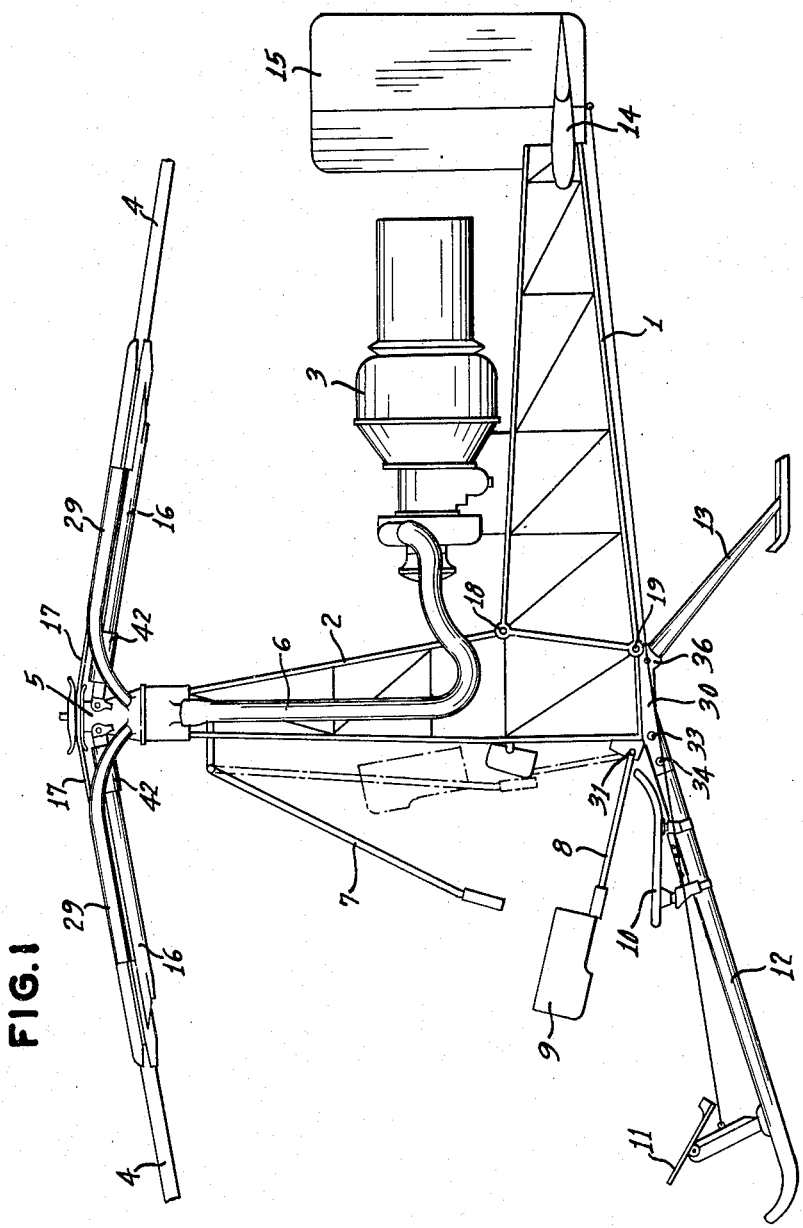
FIGURE 1 is a view in elevation of the helicopter ready for take-off.

The structure of the helicopter as well as the folding process is illustrated in FIGURES 1 and 2. Similar parts have the same reference numerals in all figures of the drawings.

Figure 4A:
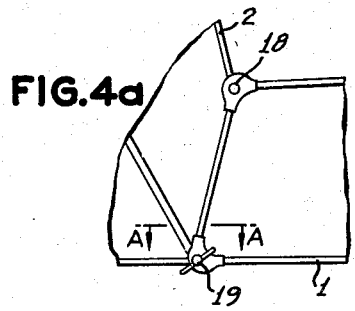
Figure 4B:
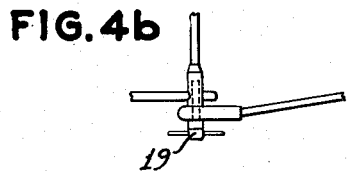

The aircraft is divided into two primary assemblies or components, i.e., the tail boom 1 and the rotor boom 2. In the embodiment of the invention shown, these parts have an open type construction without covering. The tail boom 1 and the rotor boom 2 are connected with each other by a joint or pivot 18 which is located on the upper side of the tail boom. When the helicopter is in condition for flight, as shown in FIGURE 2, the two primary parts of the aircraft are secured in place by a locking device 19. FIGURE 4a shows a part of the tail boom 1, a part of the rotor boom 2, the connecting joint or pivot 18, and the locking device in a larger scale. FIGURE 4b shows the construction of FIGURE 4a in a plane taken on line A—A of FIGURE 4a, and looking in the direction of the arrows. A bolt 19 is employed as the locking device in FIGURES 4a and 4b and, after unlocking the lock 19, the rotor boom 2 can be tilted forward and, as showni n FIGURE 4a, the lower portion thereof can be swung inside the tail boom 1 so that one of the primary aircraft components lies partially inside the other. In this folded condition, they both extend in essentially the same direction resulting in a generally elongated form or shape.

A power unit 3 is fixedly mounted on the tail boom 1 and one or more flexible compressed air tubes 6 leads from the power unit to the rotor head 5. The horizontal stabilizers 14 are secured on the tail boom 1 in a manner such that, after unlocking a lock on the lower side thereof, they can be folded upwardly to a position as shown in FIGURE 2 in which position they lie closely adjacent to the vertical stabilizer 15 which need not be folded.

The rotor blades 4 are flexibly suspended at the rotor head in a conventional manner, the spring blades 17 being utilized for this purpose. The support tubes 16 are provided to support the rotor blades against the rotor head when the rotor is standing still and the helicopter is ready for flight and also to counteract the bending moment. Compressed air is conducted through the flexible hoses 29 from the rotor head to the rotor blades. To fold the rotor blades, the support tubes 16 can be taken apart and it is then possible to swing the rotor blades 4 closely adjacent to the folded fuselage, the swinging of the blades being achieved as a result of their suspension by the flexible springs 17. One embodiment of the separable support tubes 16 is shown in FIGURES 9a and 9b in which FIGURE 9b shows these parts as they appear when the helicopter is ready for flight and FIGURE 9b as they appear when the helicopter is prepared for folding. Adjacent the rotor head 5, the support tube is divided into a relatively long portion 16 fixed to the rotor blade and a relatively shorter portion 16' fixed to the rotor head. Both of these portions are connected with each other by means of a sleeve 42. By unlocking the locking bolts 43 and sliding the sleeve 42 back, the support tubes 16 can be taken apart. Thereafter, the rotor blades 4 can be easily placed alongside the fuselage. The compressed air hoses 29 are very elastic and flexible and need not be loosened in order to fold the rotor blades.

Figure 5A:
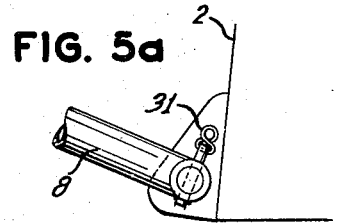
Figure 5B:
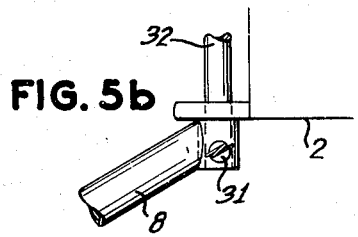

The rotor boom also supports the lever arm 8 for the collective pitch control which lever arm has the instrument box 9 at the end thereof. By unlocking the lock 31, the lever arm 8 can be pivoted into the position shown in phantom in FIGURE 1 so that it will lie closely adjacent the rotor boom. FIGURES 5a and 5b show a view in elevation and a plan view, respectively, in enlarged scale of the lock for the lever arm 8. When the locking bolt 31 is removed, the lever can be pivoted about the shaft 32 without removing the instrument cable, connections, or operating devices for regulation of the power unit.

Figure 6A:
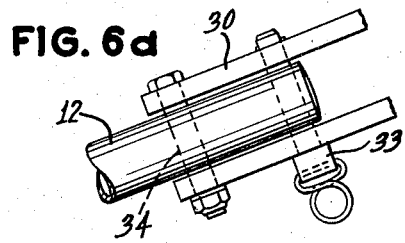
Figure 6B:
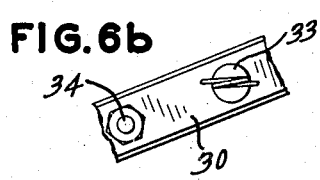

The frame for the landing gear 30 is located at the lower end of the rotor boom and has an attachment point for the tripod landing gear. The front strut 12 with the rudder pedals 11 is attached to the frame 30 and can be pivoted thereon. For example, this can be achieved in the manner shown in FIGURES 6a and 6b in which the strut 12 is positioned between two arms of the landing gear frame 30. A bolt 34 serves as the pivot point while locking is effected by means of a bolt secured by a pin 33. When swinging the front strut adjacent the rotor boom 2, into the position shown in FIGURE 2, the cables for the rudder control are not affected and need not be disconnected. If necessary or desired, the pilot seat, after unlocking a locking device, can be swung or slid into another position on the front strut such as that shown in FIGURE 2, for example.

Figure 8:
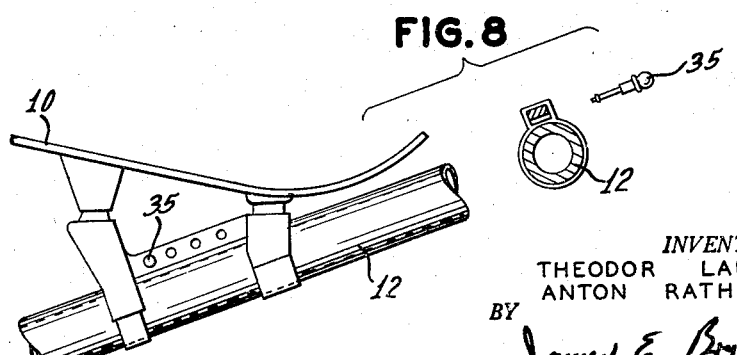

In FIGURE 8 is shown a detail of the seat for the pilot. The seat 10 is secured to the strut 12 by a locking bolt 35.

Figure 7:
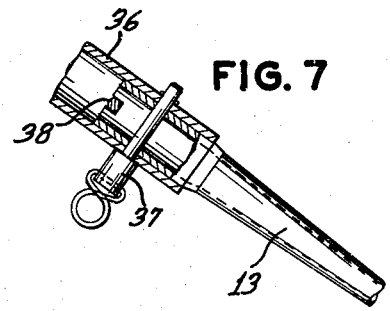

The landing gear frame 30 has, adjacent the rear thereof, two tubelike sleeves 36 for receiving the two rear struts 13. Since a portion of the rotor boom 2, having the landing gear frame 30 thereon will, when the helicopter is folded, lie inside the tail boom 1, there is no possibility of folding or tilting away the two rear struts 13. Therefore, these rear struts are the only parts which must be completely removed when the helicopter is folded. When the helicopter is made ready for flight, the struts are secured within the sleeves 36 by the bolts 37, as shown in FIGURE 7. A pin 38 serves as a stop means and prevents rotation of the struts 13 in the sleeve 36. Of course, the embodiment shown in the drawing may be modified in a manner such that when folding the helicopter the tail boom is received within the rotor boom and, in this construction, it is possible to fold the rear struts.

The control stick 7 for cyclic pitch control can be pivoted or folded closely adjacent to the rotor boom 2 as shown in phantom in FIGURE 1. Details of this construction are shown in FIGURES 10a through 10d. FIGURES 10a and 10b show the folding or pivot point of the control stick in elevation and plan views, respectively, in a condition ready for flight whereas FIGURES 10c and 10d show this element in folded condition. After unlocking the locking bolt 39, the splined portion 40 of the control stick 7' is disengaged thereby permitting the control stick 7 to be folded or pivoted. A guide pin 41 ensures that the splined shaft is always properly reassembled. Of course, all the locking devices for folding and swinging parts, such as the locking bolts, are secured in a conventional manner in order to prevent them from falling out when the aircraft is ready for flight and to prevent their loss when the helicopter is folded. Such securing means may be cotter pins or other well known quick-release locking devices.

The sequence of operations for folding the aircraft is as follows:

(1) The rotor blades are placed in a cross-wise position, i.e., normal to the longitudinal axis of the helicopter, (2) The horizontal stabilizers are folded upwardly, (3) The lever 8 for the collective pitch control, together with the instrument box 9, is swung upwardly so that it is adjacent the rotor boom, (4) The seat for the pilot 10 is slid on the strut 12 to a lower position, (5) The control stick 7 for the cyclic pitch control is folded adjacent the rotor boom, (6) The front strut 12, together with the rudder pedals 11, is folded upwardly, (7) The helicopter is tilted forward to an angle of approximately 90° and the locking bolt 19 between the rotor boom 2 and the tail boom 1 is unlocked, (8) The rear struts 13 are removed and the tail boom is lowered onto the working platform, and (9) The rotor blades 4 are swung closely adjacent the rotor boom and the tail boom.

When completely folded, the helicopter has the form shown in FIGURE 2. All cumbersome elements then lie against the rotor boom and the tail boom, both of which lie in an essentially straight line. The folded helicopter can then be packed in a rectangular box, which box will then contain the entire unit including the landing gear and the rotor blades. The box ensures that the helicopter is protected against damage and facilitates easy loading on or in a transport vehicle. The box is fitted with securing and attachment devices for the folded or dismantled parts and, when the box is open, the side walls thereof can be lowered to serve as a take-off platform.

The support and attachment of the helicopter in the transport box is at those points of the helicopter which in flight or in landing are subjected to the greatest stresses and, therefore, are the strongest. A decrease in the useful load as a result of carrying attachment devices for use only in transportation is thereby eliminated.

In special cases, the box with the helicopter stored therein may be dropped from a cargo aircraft by parachute. For reducing the impact, the box can be provided with an inflatable rubber cushion on the underside thereof.

FIGURE 3 shows the helicopter in folded condition packed in a box 20. The box 20 has the side walls 21 and the eye 22 for attaching the box to a parachute. The box also has an impact shock absorber 23 thereon and a plastic foam cushion 24 for protection of the rotor head and the spider. Other elements of the box are the hinges 25, the rotor blade support 26, the fuselage support 27, and the tail boom support 28. Since in this embodiment the rear struts on the landing gear are completely removed, the struts 13 are packed separately along the side walls of the transport box.

The various constructional features of the helicopter of the invention permit an easy and rapid dismantling and reassembly of the aircraft with only a few operations. The preparation of the closed box for loading requires but little time. Starting from the boxed condition, the helicopter can be made ready for flight in a very short time by one person and without special tools. As mentioned above, the reassembly can be effected quickly and easily even in the dark. While the invention has been described with reference to a helicopter driven by jet reaction on the rotor blades, the invention can also be adapted to a mechanically powered helicopter with special provisions for folding it, for example, for the clutches and joints between the power unit and the rotors, i.e., both the primary rotor and the tail rotor.

It will be obvious to those skilled in the art that many modifications may be made within the scope of the present invention without departing from the spirit thereof, and the invention includes all such modifications.

What is claimed is:

1. A foldable light helicopter divided into two primary components comprising a tail boom and a rotor boom, the components being connected to each other by, and pivotable about, a connecting joint, the helicopter when folded having a generally elongated shape and one of the primary components being folded partially into the other, and means whereby projecting parts connected to the primary components can be swung to position adjacent the components after the actuation of unlocking means.

2. A foldable light helicopter according to claim 1 in which the connecting joint is mounted on the upper side of the tail boom.

3. A foldable light helicopter according to claim 1 including jet reaction powered rotor blades and flexible gas conduits between the rotor blades and a supporting rotor head.

4. A foldable light helicopter according to claim 1 including rotor blades which, after the removal of supporting means, can be swung down to positions on both sides of the folded helicopter.

5. A foldable light helicopter according to claim 1 including a power unit fixedly mounted on the tail boom, and flexible gas conduits connecting the power unit with a rotor head on the rotor boom.

6. A foldable light helicopter according to claim 1 in which the folded helicopter is supported, in a transporting container, at those points designed to withstand high stresses.

References Cited in the file of this patent

UNITED STATES PATENTS

| | | |
|---|---|---|
| 2,818,226 | Hiller et al. | Dec. 31, 1957 |
| 2,994,384 | Stevens | Aug. 1, 1961 |
| 3,029,047 | Jacobsen et al. | Apr. 10, 1962 |